US010324883B2

(12) United States Patent
Takahashi et al.

(10) Patent No.: US 10,324,883 B2
(45) Date of Patent: Jun. 18, 2019

(54) COMPUTER SYSTEM, DATA-PROCESSING APPARATUS, BUS-DATA TRANSFERRING METHOD, AND COMPUTER-READABLE RECORDING MEDIUM FOR TRANSFERRING DATA FLOWING THROUGH SYSTEM BUS

(71) Applicant: NEC Corporation, Tokyo (JP)

(72) Inventors: Masahiko Takahashi, Tokyo (JP); Youichi Hidaka, Tokyo (JP)

(73) Assignee: NEC Corporation, Tokyo (JP)

( * ) Notice: Subject to any disclaimer, the term of this patent is extended or adjusted under 35 U.S.C. 154(b) by 40 days.

(21) Appl. No.: 15/129,067

(22) PCT Filed: Feb. 27, 2015

(86) PCT No.: PCT/JP2015/001031
§ 371 (c)(1),
(2) Date: Sep. 26, 2016

(87) PCT Pub. No.: WO2015/145983
PCT Pub. Date: Oct. 1, 2015

(65) Prior Publication Data
US 2017/0109310 A1    Apr. 20, 2017

(30) Foreign Application Priority Data

Mar. 28, 2014  (JP) .................................. 2014-068140

(51) Int. Cl.
*G06F 9/455*    (2018.01)
*G06F 9/46*     (2006.01)
(Continued)

(52) U.S. Cl.
CPC .......... *G06F 13/4068* (2013.01); *G06F 9/455* (2013.01); *G06F 9/45545* (2013.01);
(Continued)

(58) Field of Classification Search
CPC .. G06F 9/455; G06F 9/45558; G06F 9/45545; G06F 9/46; G06F 13/10;
(Continued)

(56) References Cited

U.S. PATENT DOCUMENTS 7,478,173 B1 * 1/2009 Delco ................. H04L 12/2865
709/250
8,601,473 B1   12/2013 Aron et al.
(Continued)

FOREIGN PATENT DOCUMENTS

JP   2004-127083 A   4/2004
JP   2005-521115 A   7/2005
(Continued)

OTHER PUBLICATIONS

International Search Report corresponding to PCT/JP2015/001031, dated May 19, 2015, 2 pages.
(Continued)

*Primary Examiner* — Eric T Oberly
(74) *Attorney, Agent, or Firm* — Wilmer Cutler Pickering Hale and Dorr LLP

(57) ABSTRACT

This invention expands the scope of application of a pass-through technology in which a guest OS directly controls a remote device that is connected via a network. This data-processing apparatus is provided with a host OS that provides a virtual hardware environment to a guest OS that performs I/O processing with respect to a device implemented in a remote apparatus connected via a network. The host OS has a bus extension unit that traps I/O instructions issued by the guest OS, encapsulates the trapped I/O instructions, and delivers the encapsulated I/O instructions to the remote apparatus as network packets.

9 Claims, 16 Drawing Sheets

(51) Int. Cl.
*G06F 13/10* (2006.01)
*G06F 13/40* (2006.01)

(52) U.S. Cl.
CPC ............ *G06F 9/45558* (2013.01); *G06F 9/46* (2013.01); *G06F 13/10* (2013.01); *G06F 13/4022* (2013.01); *G06F 2009/45579* (2013.01); *G06F 2009/45595* (2013.01)

(58) Field of Classification Search
CPC ............ G06F 13/4022; G06F 13/4068; G06F 2009/45579; G06F 2009/45595
See application file for complete search history.

(56) References Cited

U.S. PATENT DOCUMENTS

| | | |
|---|---|---|
| 2007/0198763 A1 | 8/2007 | Suzuki et al. |
| 2008/0028120 A1* | 1/2008 | McLeod ............ G06F 13/4045 710/313 |
| 2010/0250883 A1 | 9/2010 | Oshida |
| 2012/0183001 A1 | 7/2012 | Suzuki et al. |
| 2013/0346978 A1* | 12/2013 | Jiang .................. G06F 9/45533 718/1 |
| 2014/0164648 A1* | 6/2014 | Barber .................. G06F 13/122 710/8 |

FOREIGN PATENT DOCUMENTS

| | | |
|---|---|---|
| JP | 2007-219873 A | 8/2007 |
| JP | 2010-079816 A | 4/2010 |
| JP | 2010-097567 A | 4/2010 |
| JP | 2010-113606 A | 5/2010 |
| JP | 2010-237737 A | 10/2010 |
| WO | WO-2011/090145 A1 | 7/2011 |
| WO | WO-2013/150792 A1 | 10/2013 |

OTHER PUBLICATIONS

Written Opinion of International Search Authority corresponding to PCT/JP2015/001031, dated May 19, 2015, 5 pages.

Notification of Reasons for Refusal issued by the Japan Patent Office for Japanese Application No. 2016-509954 dated Oct. 2, 2018 (6 pages).

* cited by examiner

Fig.12

| MAC ADDRESS | INFORMATION ABOUT REMOTE DEVICE 26 |
|---|---|
| 00:00:00:00:00:10 | STORAGE a MANUFACTURED BY COMPANY A |
| 00:00:00:00:00:20 | KEYBOARD b MANUFACTURED BY COMPANY B |

Fig.14

| MAC ADDRESS | INFORMATION ABOUT REMOTE DEVICE 26 | MANAGEMENT GUEST OS |
|---|---|---|
| 00:00:00:00:00:10 | STORAGE a MANUFACTURED BY COMPANY A | A |
| 00:00:00:00:00:20 | KEYBOARD b MANUFACTURED BY COMPANY B | B |

COMPUTER SYSTEM, DATA-PROCESSING APPARATUS, BUS-DATA TRANSFERRING METHOD, AND COMPUTER-READABLE RECORDING MEDIUM FOR TRANSFERRING DATA FLOWING THROUGH SYSTEM BUS

CROSS-REFERENCE TO RELATED APPLICATIONS

This application is a national stage application of International Application No. PCT/JP2015/001031 entitled "COMPUTER SYSTEM, DATA-PROCESSING APPARATUS, BUS-DATA TRANSFERRING METHOD, AND COMPUTER-READABLE RECORDING MEDIUM," filed on Feb. 27, 2015, which claims the benefit of the priority of Japanese Patent Application No. 2014-068140 filed on Mar. 28, 2014, the disclosures of each of which are hereby incorporated by reference in their entirety.

TECHNICAL FIELD

The present invention relates to a computer system, a data-processing apparatus, a bus-data transferring method, and a computer-readable recording medium. In particular, the present invention relates to a computer system, a data-processing apparatus, a bus-data transferring method, and a computer-readable recording medium for transferring data flowing through a system bus to a remote apparatus connected via a network.

BACKGROUND ART

A computer includes a central processing unit (CPU) and devices that are interconnected through a system bus (hereinafter also referred to as "bus"), and the device is accessed by an instruction of a program running on the CPU. Access to the device is called "input/output processing" or "I/O processing". On the other hand, software that controls the devices is called "operating system (OS)". Software that controls a device in particular in the OS is called a "device driver". Further, a plurality of user programs are executed on the OS under control of the OS. In order to prevent direct access by the user program to the device, the user program is given an execution permission different from the execution permission of the OS.

Examples of CPUs include Xeon (registered trademark) and Atom (registered trademark) from Intel Corporation. Meanwhile, examples of OSs include Windows (registered trademark) from Microsoft Corporation and Linux (registered trademark). Further, examples of system buses include PCI (Peripheral Component Interconnect) and PCI-Express. Moreover, examples of devices include an HDD (hard disk drive) and a NIC (network interface card).

Devices are scanned by a BIOS (Basic Input/Output System) during boot-up of a computer, and identifiers (IDs) and memory areas are allocated to the devices. At this point of time, the devices are not available. After startup of the OS, device drivers for the devices that are compatible with the OS among the scanned devices initialize the devices. As a result, the devices are made available.

There are two known methods for the running OS to access a device: access by issuing an I/O instruction and access by MMIO (Memory-Mapped I/O). In the former method, I/O instructions are defined as an instruction set for the CPU. A program issues a CPU instruction to output an I/O request onto the bus, thereby accomplishing access to the device. In the latter method, on the other hand, when the OS accesses a particular memory address, the CPU or a chipset that controls the bus converts the access to I/O processing and outputs the I/O processing to the bus, thereby accomplishing access to the device. Because the BIOS allocates a memory space size requested by a device to a physical memory space when the BIOS scans the device as mentioned above, memory access to the allocated physical memory space is substituted with an I/O request. Hereinafter, the two methods of device access will be collectively referred to as "I/O instruction". When a device is accessed, an ID identifying the device (such as a memory address and an ID of a slot to which the device is inserted) is specified in the I/O instruction.

Formerly, a single OS has been running on a CPU because performance of the single CPU has been insufficient. Recently, however, some amount of software overhead will be accepted because of improved performance of a CPU. This improvement enables a plurality of virtual hardware environments to run on a single CPU by virtualizing hardware.

FIG. 15 is a block diagram illustrating an exemplary configuration of such a virtual computer. An OS that manages a virtual hardware environment as illustrated in FIG. 15 is referred to as a host OS 104. An OS running in a virtual hardware environment, on the other hand, is referred to as a guest OS 108. While it is possible to run only a single host OS 104, it is possible to run a plurality of guest OSs 108. Guest OSs 108 may be of a type different from the type of the host OS 104, and guest OSs 108 may be of types different from one another. Known examples of host OSs 104 that provide a virtual hardware environment include Kernel-based Virtual Machine (KVM) and VMware (registered trademark) and ESXi server from VMWare, Inc.

In a virtual environment, in general, a virtualized device A (hereinafter referred to as "virtual device") 106 is provided to a guest OS 108 instead of the guest OS 108 directly recognizing a device B 103 connected to the host OS 104. In other words, a device driver B 105 held by the host OS 104 controls the device B 103. A device driver A 109 held by the guest OS 108, on the other hand, controls the virtual device A 106. In this case, an I/O instruction issued by the device driver A 109 held by the guest OS 108 is converted in the host OS 104 so that a device driver of the device B103 can interpret the I/O instruction.

Meanwhile, PTL 1 discloses a "pass-through technique" in which a device is managed by a device driver held by a guest OS instead of a host OS. According to the technique described in PTL 1, some of the devices connected to the computer can be controlled by the guest OS, in place of the host OS.

Further, PTL 2 discloses a technique that virtually extends a bus. According to the technique described in PTL 2, a distance between a CPU and a device can be physically extended by transferring data on a PCI-Express bus to a network such as the Ethernet (registered trademark). On the PCI-Express bus, data are transferred in a form of packets. A packet is a transfer unit for performing communication between two points, and typically source and target addresses are contained in the packet.

FIG. 16 is a block diagram illustrating an exemplary configuration of a computer to which the bus extension technique described in PTL 2 is applied. Referring to FIG. 16, according to the technique described in PTL 2, an upstream bridge 202 is provided on the CPU 201 side and a downstream bridge 400 is provided on a device (a peripheral device 500) side. The bridges 202 and 400 encapsulate or decapsulate (i.e. remove capsulation of) packets. The encapsulation enables data to flow from a bus to an Ethernet network. Since the Ethernet transfers data in packets, a packet flowing through a network will be hereinafter referred to as "network packet".

In addition, PTL 3 describes a technique in which, when data are sent from a PC (personal computer) to a printer connected to the PC via a network, a printer driver generates a control command in accordance with an access request that occurs on the PC, an USB (Universal Serial Bus) printer class driver converts the control command to a USB packet, and the network protocol layer sends the USB packet to a device server as a network packet.

PTL 4 also describes a technique in which a virtualization bridge performs only management being common to I/O devices and a system manager connected via a network performs processing that is dependent on individual I/O devices by using software provided by individual manufacturers.

Moreover, PTL 5 describes a technique for providing an arrangement that separates an input/output device from a host computer system apparatus and connects the input/output device to the system apparatus so that the input/output device is dynamically connected to the host computer system.

CITATION LIST

Patent Literature

[PTL 1] Japanese Laid-open Patent Publication No. 2010-237737
[PTL 2] Japanese Laid-open Patent Publication No. 2007-219873
[PTL 3] Japanese Laid-open Patent Publication No. 2010-113606
[PTL 4] International Publication WO 2013/150792
[PTL 5] Japanese Translation of PCT International Application Publication No. 2005-521115

SUMMARY OF INVENTION

Technical Problem

All of the contents disclosed in the patent literatures cited above are incorporated herein by reference. The following analysis has been made by the present inventors.

A computer system in which a guest OS directly controls a remote device connected via a network can be implemented by combining the pass-through technique (FIG. 15) described in PTL 1 with the bus extension technique (FIG. 16) described in PTL 2.

However, in the computer system provided by combining the techniques described in PTL 1 and PTL 2, an upstream bridge (bus extension unit (host)) 202 needs to encapsulate an I/O instruction issued by a guest OS 108 and send out the encapsulated I/O instruction onto the network. However, the upstream bridge 202 cannot be used on a computer that is not provided with a PC card slot (for example, some laptop PCs and tablet terminals) because the upstream bridge 202 is implemented as hardware such as a PC card. Thus, there is a problem that applicability of the pass-through technique in which a guest OS directly controls a remote device connected via a network is limited by the specification and usage (for example, whether a slot is available) of the computer on which the guest OS is running.

Therefore, a problem to be solved is to expand applicability of the pass-through technique in which a guest OS directly controls a remote device connected via a network. A primary object of the present invention is to provide a computer system, a data-processing apparatus, a bus-data transferring method, and a computer-readable recording medium that help solve the problem.

Solution to Problem

A data-processing apparatus according to a first aspect of the present invention includes a host OS (Operating System) providing a virtual hardware environment for a guest OS performing I/O processing with a device implemented in a remote apparatus connected via a network, wherein the host OS includes bus extension means for trapping an I/O instruction issued by the guest OS, encapsulating the trapped I/O instruction, and sending out the encapsulated I/O instruction as a network packet to the remote apparatus.

A computer system according to a second aspect of the present, invention includes a data-processing apparatus and a remote apparatus interconnected via a network, wherein the data-processing apparatus includes a host OS (operating system) providing a virtual hardware environment to a guest OS performing I/O processing with a device implemented in the remote apparatus, and the host OS includes bus extension means for trapping an I/O instruction issued by the guest OS, encapsulating the trapped I/O instruction, and sending out the encapsulated I/O instruction as a network packet to the remote apparatus.

A bus-data transferring method according to a third aspect of the present invention includes a data-processing apparatus and a remote apparatus interconnected via a network, wherein the data-processing apparatus includes a host OS (operating system) providing a virtual hardware environment to a guest OS performing I/O processing with a device implemented in the remote apparatus, and the host OS includes bus extension means for trapping an I/O instruction issued by the guest OS, encapsulating the trapped I/O instruction, and sending out the encapsulated I/O instruction as a network packet to the remote apparatus.

A program according to a fourth aspect of the present invention causes a computer on which a host OS (Operating System) providing a virtual hardware environment to a guest OS performing I/O processing with a device implemented in a remote apparatus connected via a network, to execute the steps of trapping an I/O instruction issued by the guest OS, and encapsulating the trapped I/O instruction and sending out the encapsulated I/O instruction as a network packet to the remote apparatus . . . . Note that the program may also be provided as a program product recorded on a non-transitory computer-readable storage medium.

Advantageous Effects of Invention

A computer system, a data-processing apparatus, a bus-data transferring method, and a computer-readable recording medium according to the present invention enable expansion of applicability of the pass-through technique in which a guest OS directly controls a remote device connected via a network.

BRIEF DESCRIPTION OF DRAWINGS

FIG. 12 is a diagram illustrating an exemplary association table held by a bus extension unit (host) in the second exemplary embodiment.

FIG. 14 is a diagram illustrating an exemplary association table held by a bus extension unit (host) in the third exemplary embodiment.

DESCRIPTION OF EMBODIMENTS

Figure 1:
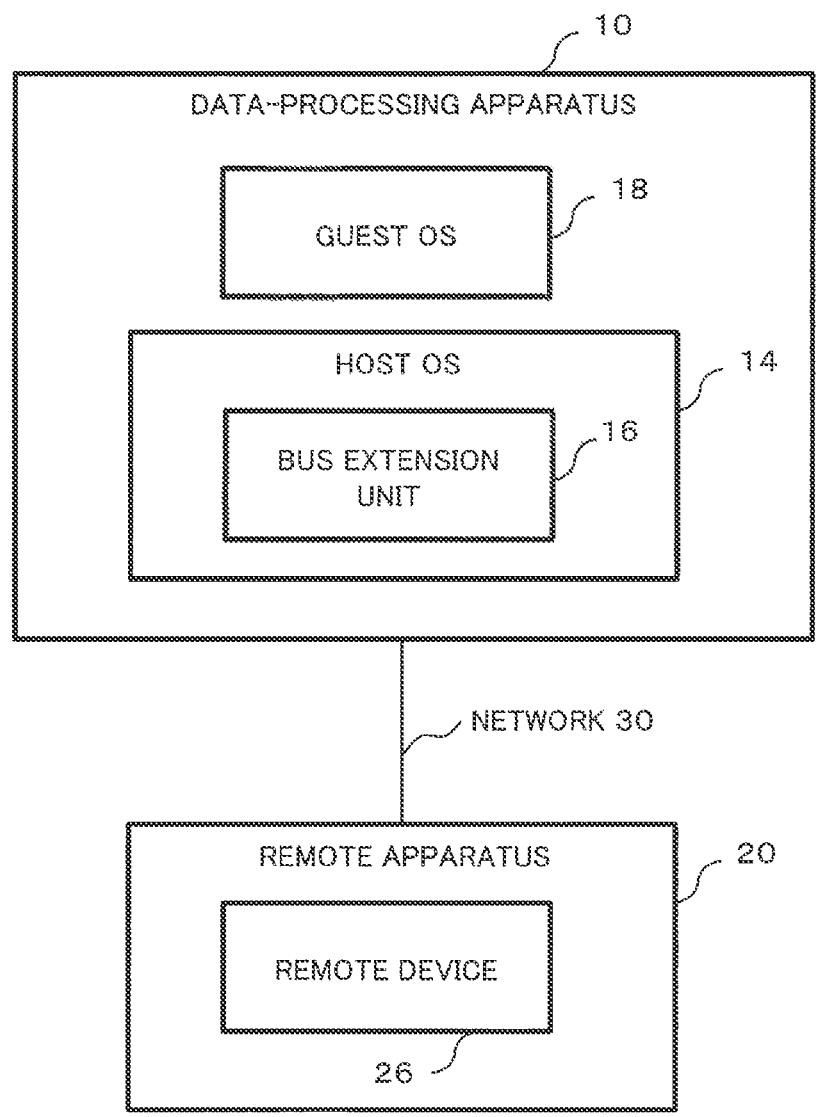
FIG. 1 is a block diagram illustrating an exemplary configuration of a computer system including a data-processing apparatus according to one embodiment of the present invention.

An overview of one embodiment will be provided first. Note that reference numerals given in the overview are only illustrative for facilitating understanding of the present invention and are not intended to limit the present invention to the illustrated modes.

FIG. 1 is a block diagram illustrating an exemplary configuration of a computer system including a data-processing apparatus 10 according to one embodiment. Referring to FIG. 1, the data-processing apparatus 10 includes a host OS (operating system) 14 which provides a virtual hardware environment to a guest OS 18 which performs I/O processing with a device (remote device 26) provided in a remote apparatus 20 connected via a network 30. The host OS 14 includes a bus extension unit 16 which traps an I/O instruction issued by the guest OS 18, encapsulates the trapped I/O instruction and sends out the encapsulated I/O instruction in the form of a network packet to the remote apparatus 20. When the bus extension unit 16 receives a response network packet in response to the sent network packet from the remote apparatus 20, the bus extension unit 16 decapsulates the response network packet to extract data and transfers the extracted data to the guest OS 18.

The remote apparatus 20 sends information including an identifier identifying a remote device 26 provided in the remote apparatus 20 and an address of a communication unit of the remote apparatus 20. The bus extension unit 16 identifies the remote device 26 provided in the remote apparatus 20 based on the information sent from the remote apparatus 20 and specifies the address of the communication unit of the remote apparatus 20 as the destination address of the network packet into which the I/O instruction is encapsulated.

Figure 15:
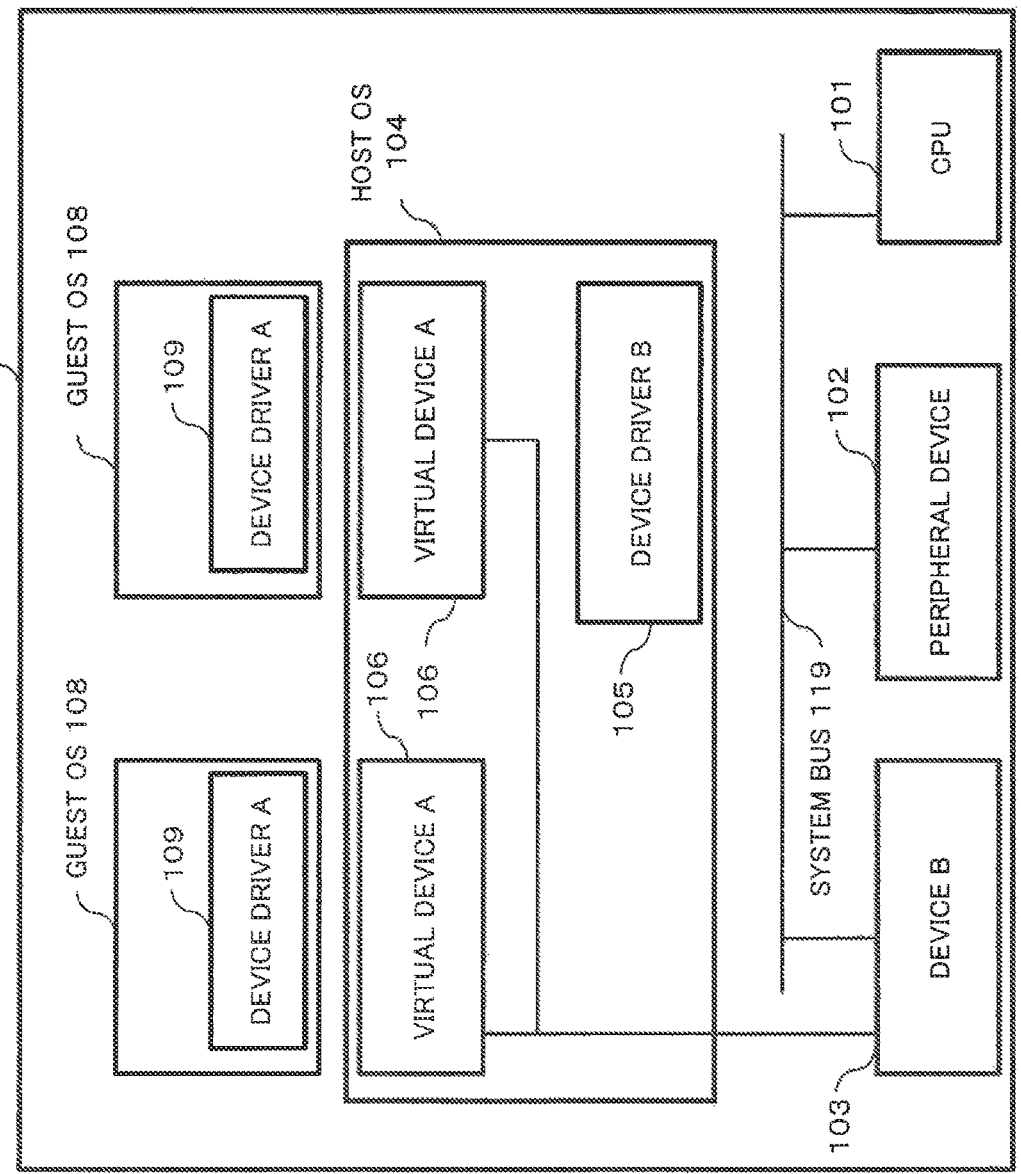
FIG. 15 is a block diagram illustrating an exemplary configuration of a virtual computer.
Figure 16:
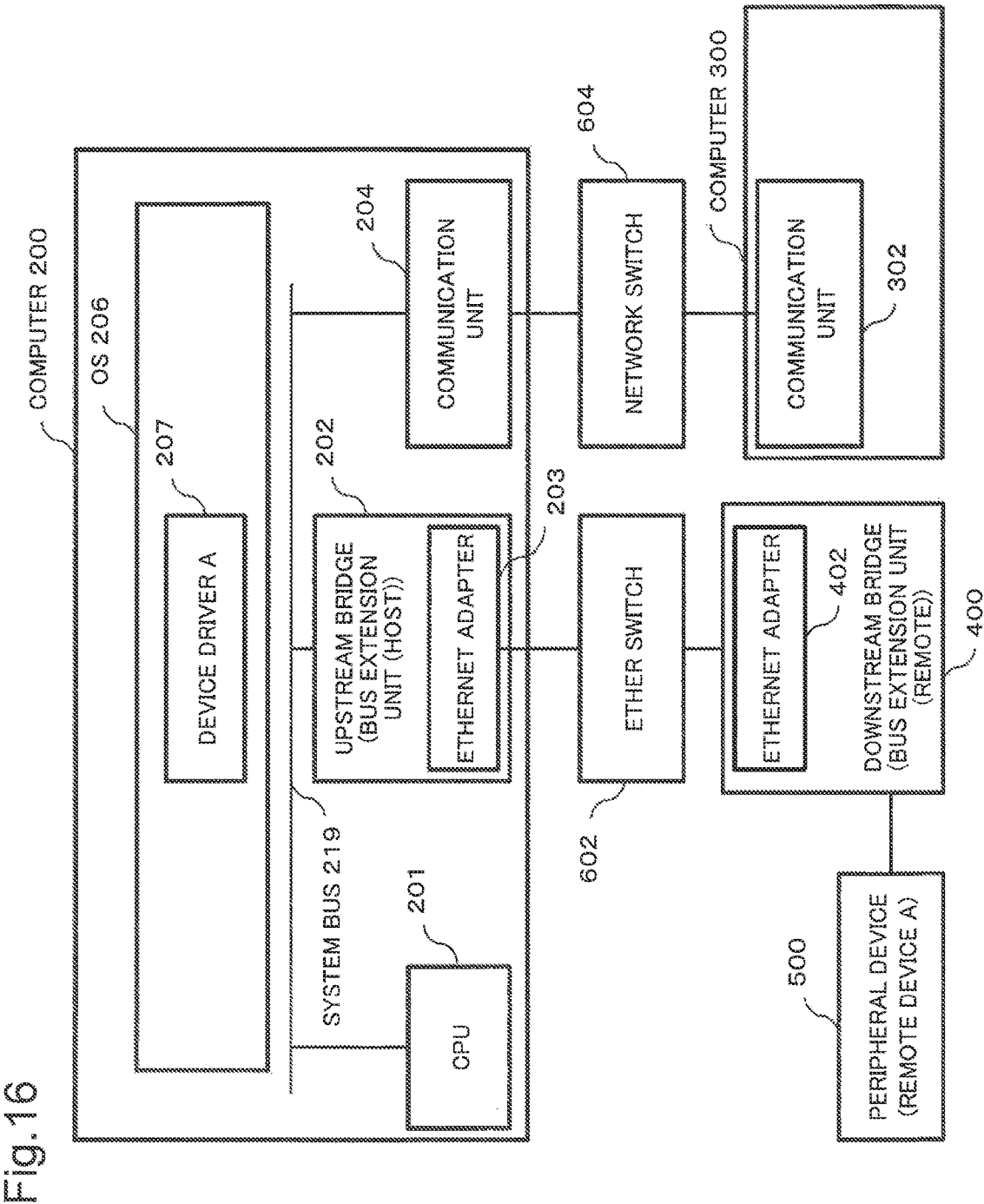
FIG. 16 is a block diagram illustrating an exemplary configuration of a computer to which a bus extension technique is applied.

In a data-processing apparatus 10 in one embodiment, the bus extension unit 16 provided in the host OS 14 traps an I/O instruction issued by the guest OS 18, encapsulates the trapped I/O instruction, and sends out the encapsulated I/O instruction in the form of a network packet to the remote apparatus 20. In this embodiment, there is no need for an upstream bridge (a bus extension unit (host)) to encapsulate the I/O instruction issued by the guest OS and send out it onto the network as in the case of a computer system provided by combining the techniques described in PTL 1 and PTL 2 (FIGS. 15 and 16). Therefore, according to the data-processing apparatus 10 of one embodiment, applicability of the pass-through technique in which a guest OS directly controls a remote device is not limited by the specifications and usage (such as whether a slot is available or not) of the computer on which the guest OS is running, and the applicability can be expanded.

In addition, when the guest OS 18 is activated after the startup of the host OS 14, the guest OS 18 uses a device driver held by the guest OS 18 to initialize a remote device 26 provided in the remote apparatus 20. This eliminates the need for recognizing the remote device to be allocated to the guest OS18 during the activation of the host OS 14 and can quickly activate the host OS 14.

First Exemplary Embodiment

[Configuration]

A computer system according to a first exemplary embodiment will be described next in detail with reference to the drawings.

Figure 2:
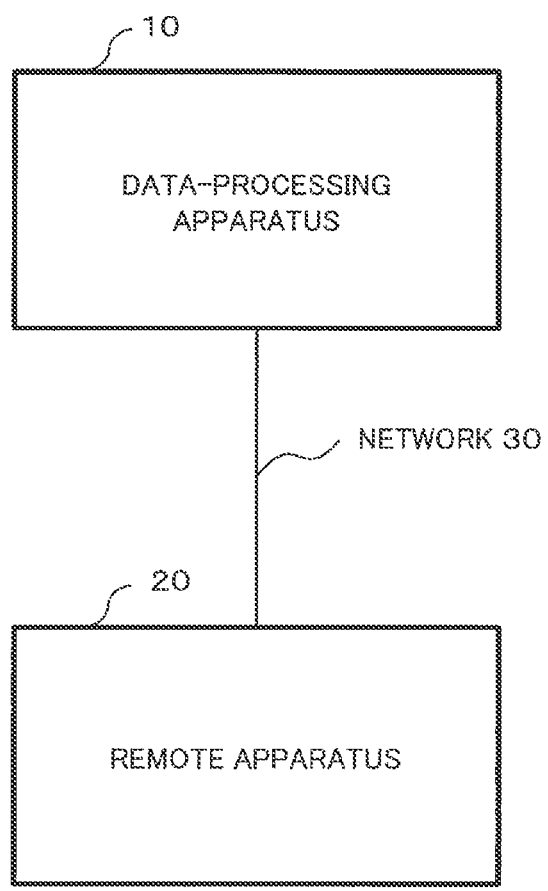
FIG. 2 is a diagram illustrating an exemplary configuration of a computer system according to a first exemplary embodiment of the present invention.

Referring to FIG. 2, the computer system according to the present exemplary embodiment includes a data-processing apparatus 10 which operates under the control of a program, and a remote apparatus 20. The data-processing apparatus 10 and the remote apparatus 20 are interconnected via a network 30.

Figure 3:
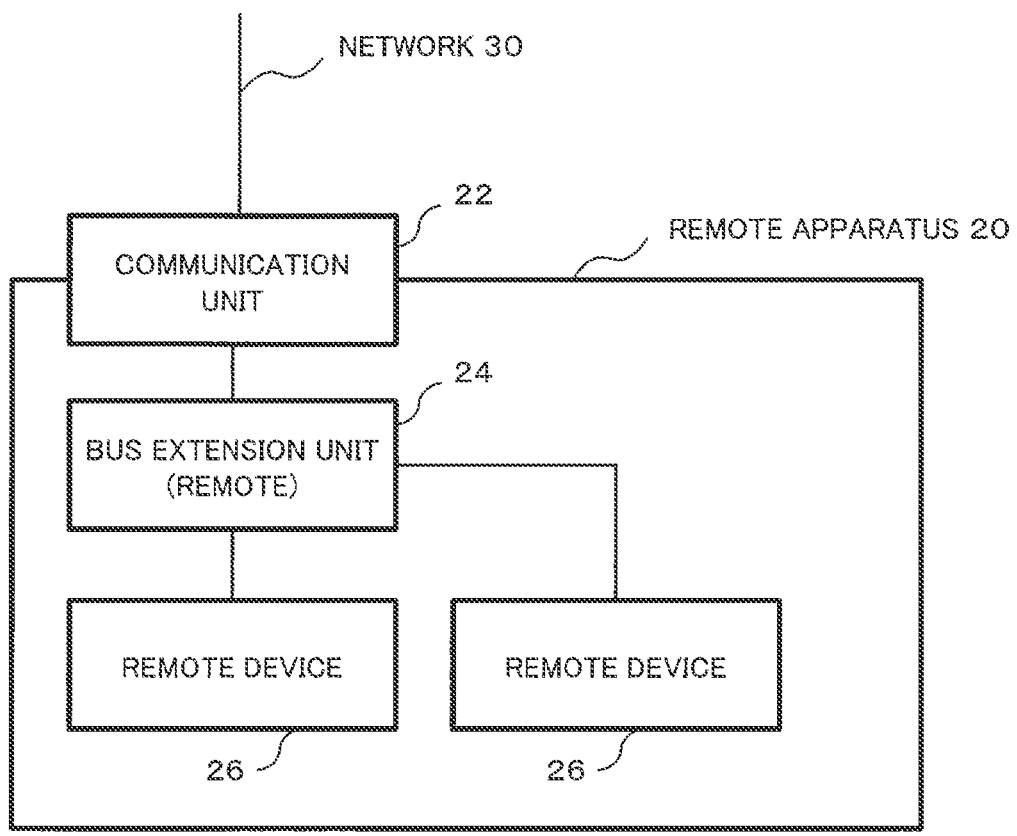
FIG. 3 is a block diagram illustrating an exemplary configuration of a remote apparatus in the first exemplary embodiment.

FIG. 3 is a block diagram illustrating an exemplary configuration of the remote apparatus 20. The configuration of the remote apparatus 20 will be described below in detail with reference to FIG. 3.

The remote apparatus 20 includes a communication unit 22, a bus extension unit (remote) 24 and a remote device 26. The remote apparatus 20 may include a plurality of the remote devices 26. The remote devices 26 may be any devices that can be connected to a system bus 19. The remote devices 26 may be a hard disk and a network interface card, for example, that can be directly connected to the bus. In addition, the bus extension unit (remote) 24 makes a pair with a bus extension unit (host), which will be described later. The bus extension unit (remote) 24 decapsulates and encapsulates data directed to the remote devices 26 and data on the bus sent out from the remote devices 26, respectively. The bus extension unit (remote) 24 may include functions such as a transmission rate control function and a retransmission control function for the case of a network packet loss on the network.

The communication unit 22 is an interface unit for communicating with a network 30. Examples of the network 30 include Ethernet and InfiniBand (registered trademark). However, the network 30 in the present invention is not limited to these, and any network that the computer can use may be used. An address (for example a Media Access Control (MAC) address) that uniquely identifies the communication unit 22 on the network 30 is assigned to the communication unit 22.

The bus extension unit (remote) 24 intermittently sends out heart beat (HB) information onto the network 30 via the communication unit 22. Typically, the HB is broadcast. However, if the bus extension unit (remote) 24 knows an address of the host side in advance, the bus extension unit (remote) 24 may send out heart beat information only to the host identified by the address. The heart beat information includes information about the remote device(s) 26 installed in the remote apparatus 20 and an address of the communication unit 22.

Figure 4:
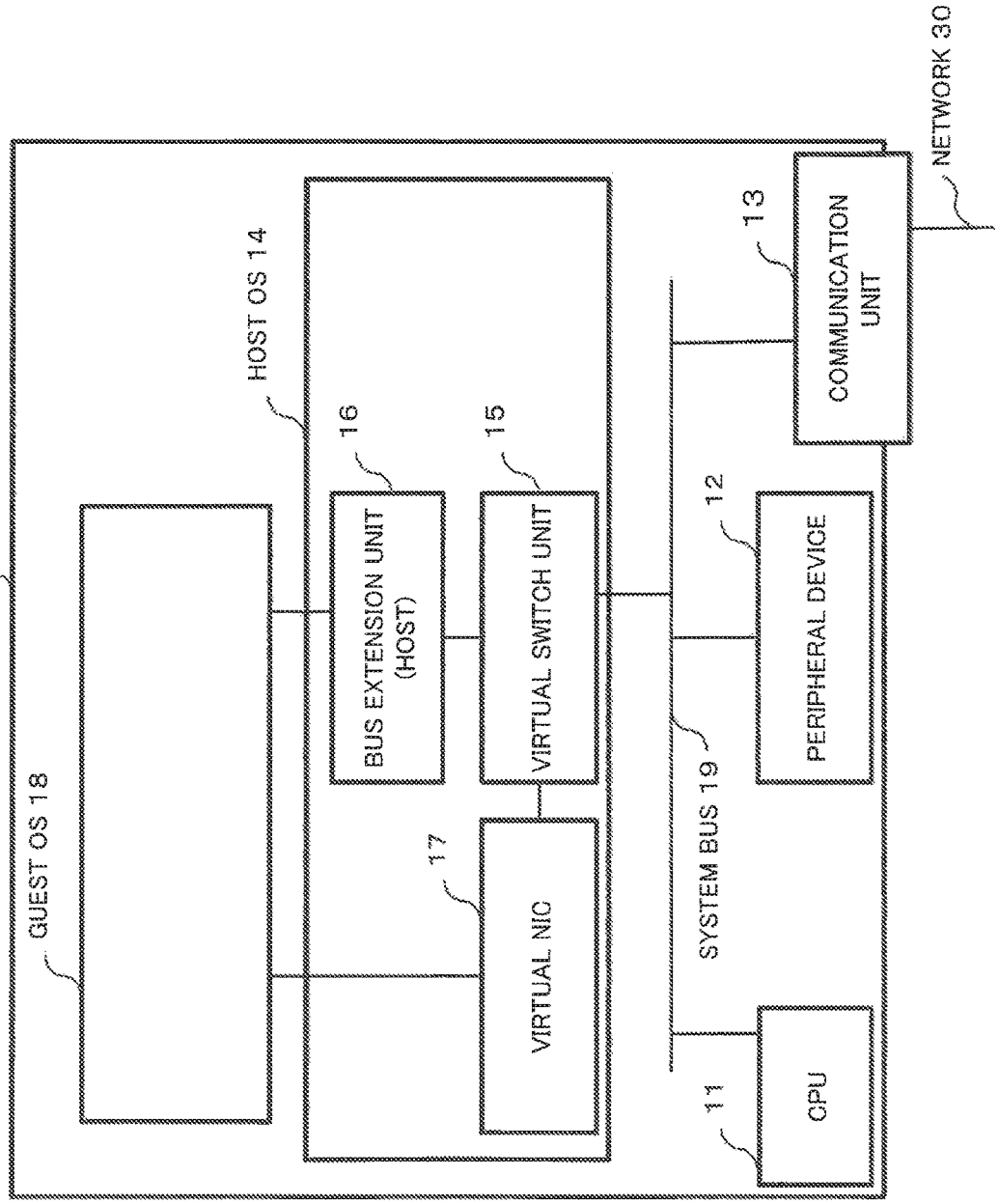
FIG. 4 is a block diagram illustrating an exemplary configuration of a data-processing apparatus in the first exemplary embodiment.

FIG. 4 is a block diagram illustrating an exemplary configuration of the data-processing apparatus 10. The configuration of the data-processing apparatus 10 will be described below in detail with reference to FIG. 4.

The data-processing apparatus 10 includes a CPU 11, a peripheral device 12 and a communication unit 13. Various programs including a host OS 14 and a guest OS 18 are executed on the CPU 11.

The peripheral device 12 is a device that can be connected to the system bus 19.

The communication unit 13 is an interface unit for communication with the network 30 such as the communication unit 22 of the remote apparatus 20.

The host OS 14 includes a virtual switch unit 15 and a bus extension unit (host) 16. The bus extension unit (host) 16 makes a pair with the bus extension unit (remote) 24 of the remote apparatus 20. When the bus extension unit (host) 16 sends out a data packet onto the network 30, the bus extension unit (host) 16 encapsulates the data packet flowing through the bus in advance, and then sends out onto the network. On the other hand, when the bus extension unit (host) 16 receives an encapsulated network packet via the network 30, the bus extension unit (host) 16 removes capsulation of (decapsulates) the encapsulated network packets and then transfers the data packet to subordinate devices. The network 30 may be an Ethernet network, and a communication protocol such as Transmission Control Protocol (TCP)/Internet Protocol (IP) may be used. However, a network and a communication protocol are not limited to those described above in the present invention.

The host OS 14 may further include a virtual NIC 17. The virtual NIC 17 is a virtual device used by the guest OS 18 to communicate with another computer or used for communication between a plurality of guest OSs. In the present exemplary embodiment, unlike the computer in FIG. 16, the bus extension unit (host) 16 and the virtual NIC 17 can share the communication unit 13. However, each of the bus extension unit (host) 16 and the virtual NIC 17 may include the communication units individually. Note that when the virtual NIC 17 is not necessary, the virtual switch unit 15 may be omitted from the host OS 14.

The guest OS 18 includes a device driver for controlling the remote device 26 included in the remote apparatus 20.

[Operation]

An operation of the computer system according to the present exemplary embodiment will be described next in detail with reference to the flowcharts in FIGS. 5 to 10.

Figure 5:
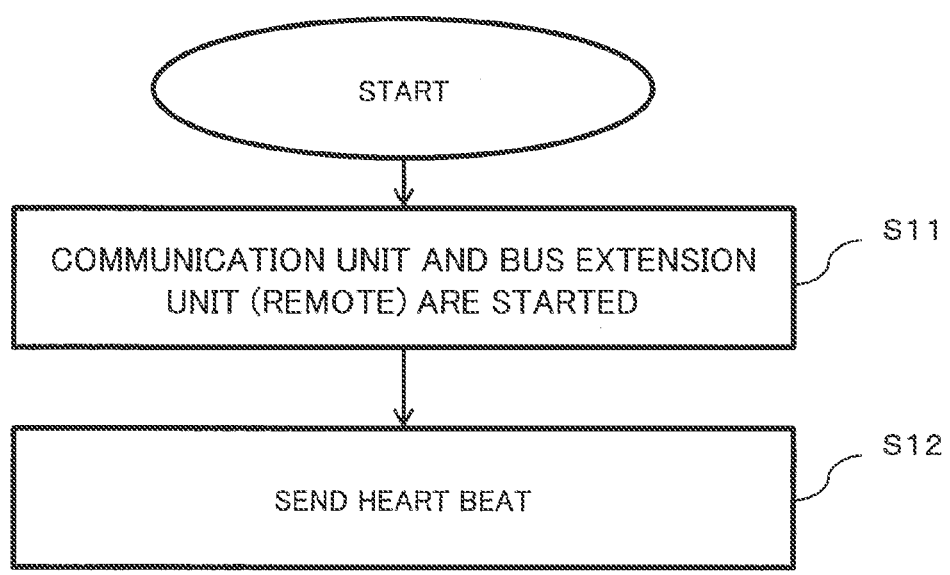
FIG. 5 is a flowchart illustrating an exemplary operation of starting a remote apparatus in the first exemplary embodiment.

FIG. 5 is a flowchart illustrating an exemplary flow of startup of the remote apparatus 20. The flow will be described in detail with reference to the flowchart in FIG. 5.

When the remote apparatus 20 is started, first the communication unit 22 and the bus extension unit (remote) 24 are started (step S11). At this point of time, although electric power is supplied to the remote device 26, the remote device 26 is initialized only by hardware on the remote device 26 and is not initialized by the device driver.

Then, the bus extension unit (remote) 24 intermittently sends a heart beat packet onto the network 30 via the communication unit 22 (step S12). When the host OS 14 has not been started, the heart beat packet is not received and is discarded on the network 30.

Figure 6:
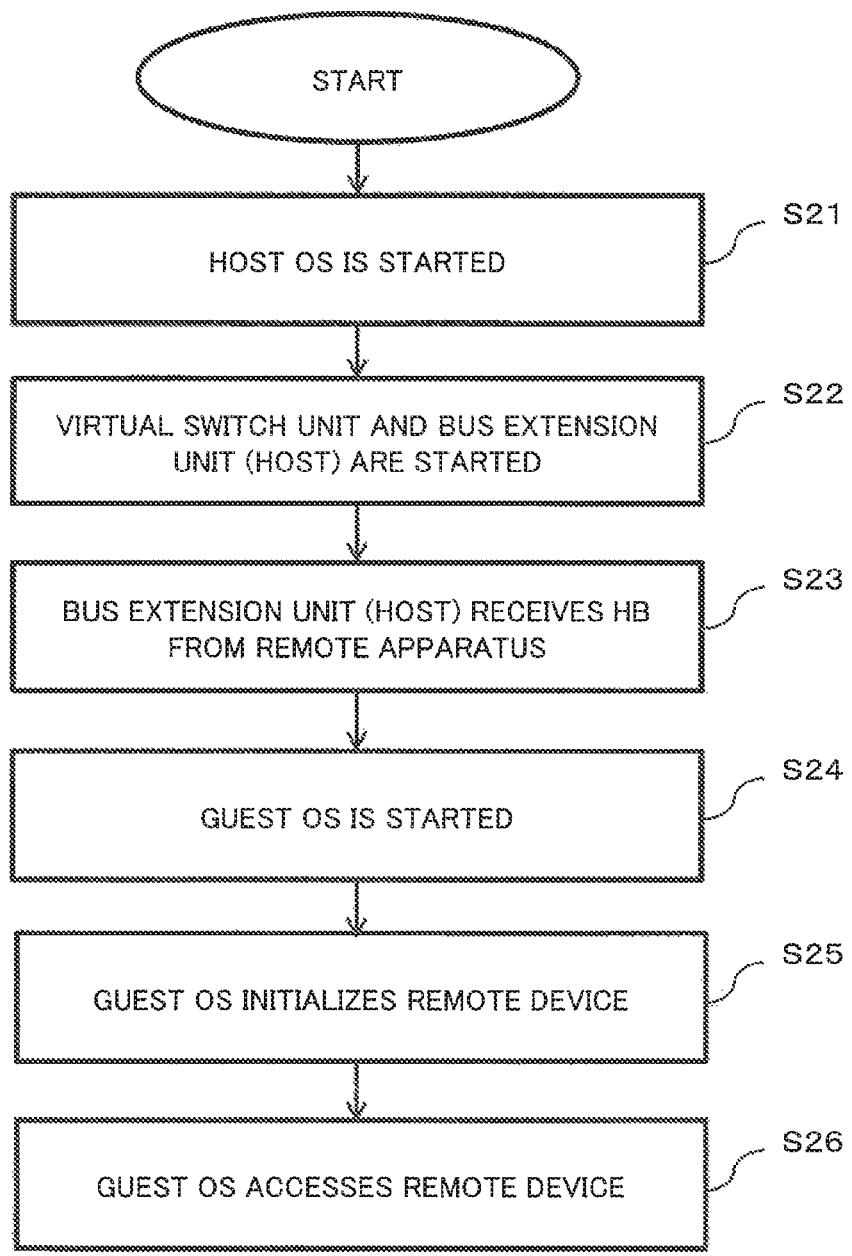
FIG. 6 is a flowchart illustrating an exemplary operation of starting the data-processing apparatus in the first exemplary embodiment.

FIG. 6 is a flowchart illustrating an exemplary flow of start of the data-processing apparatus 10. The flow will be described below in detail with reference to the flowchart in FIG. 6.

When the data-processing apparatus 10 is started, then the host OS 14 is started (step S21). The host OS 14 initializes the peripheral device 12 and the communication unit 13 included in the data-processing apparatus 10. As a result, the communication unit 13 included in the data-processing apparatus 10 becomes available.

Then, the bus extension unit (host) 16 and the virtual switch unit 15 are started (step S22).

The remote apparatus 20 may be started at any time before start of the guest OS 18 to which the remote apparatus 20 is connected. The operation of activating the remote apparatus 20 is the same as the operation described with reference to FIG. 5.

At this point of time, the remote apparatus 20 has already started, and the bus extension unit (host) 16 receives a heart beat (HB) from the remote apparatus 20 (step S23). This allows the bus extension unit (host) 16 to recognize the remote device 26 connected to the remote apparatus 20, and to acquire information with respect to the remote device 26. The bus extension unit (host) 16 acquires the address for the communication unit 22 of the remote apparatus 20 based on the heart beat information.

Then, the guest OS 18 is started (step S24). During a device scan at the start of the guest OS 18, the bus extension unit (host) 16 makes the remote device 26 appear as if the remote device 26 were a device of the guest OS 18. Specifically, the bus extension unit (host) 16 encapsulates an I/O instruction for device scan and sends the encapsulated I/O instruction in the form of a network packet to the virtual switch unit 15. The bus extension unit (host) 16 then receives a network packet sent back as a response from the remote apparatus 20 through the virtual switch unit 15, decapsulates the network packet and passes the decapsulated network packet to the guest OS 18. When the guest OS 18 has a device driver for the remote device 26, the guest OS 18 initializes the remote device 26 (step S25).

The guest OS 18 accesses the initialized remote device 26 as necessary (step S26).

Regarding the computer system provided by combining the techniques described in PTL 1 and PTL, there is a problem that a remote device to be allocated to a guest OS needs to be scanned during the start process of the host OS, and accordingly, it takes much time to start the host OS. In contrast, in the flow of activation of the data-processing apparatus of the present exemplary embodiment (FIG. 6), the remote device 26 does not need to be recognized and initialized during the start process of the host OS and accordingly the host OS can be quickly started. In other words, according to the present exemplary embodiment, the host OS can be quickly started in an environment in which a device connected via a network can be allocated to a guest OS.

Next, a flow of I/O from the guest OS 18 to the remote device 26 will be described.

Figure 7:
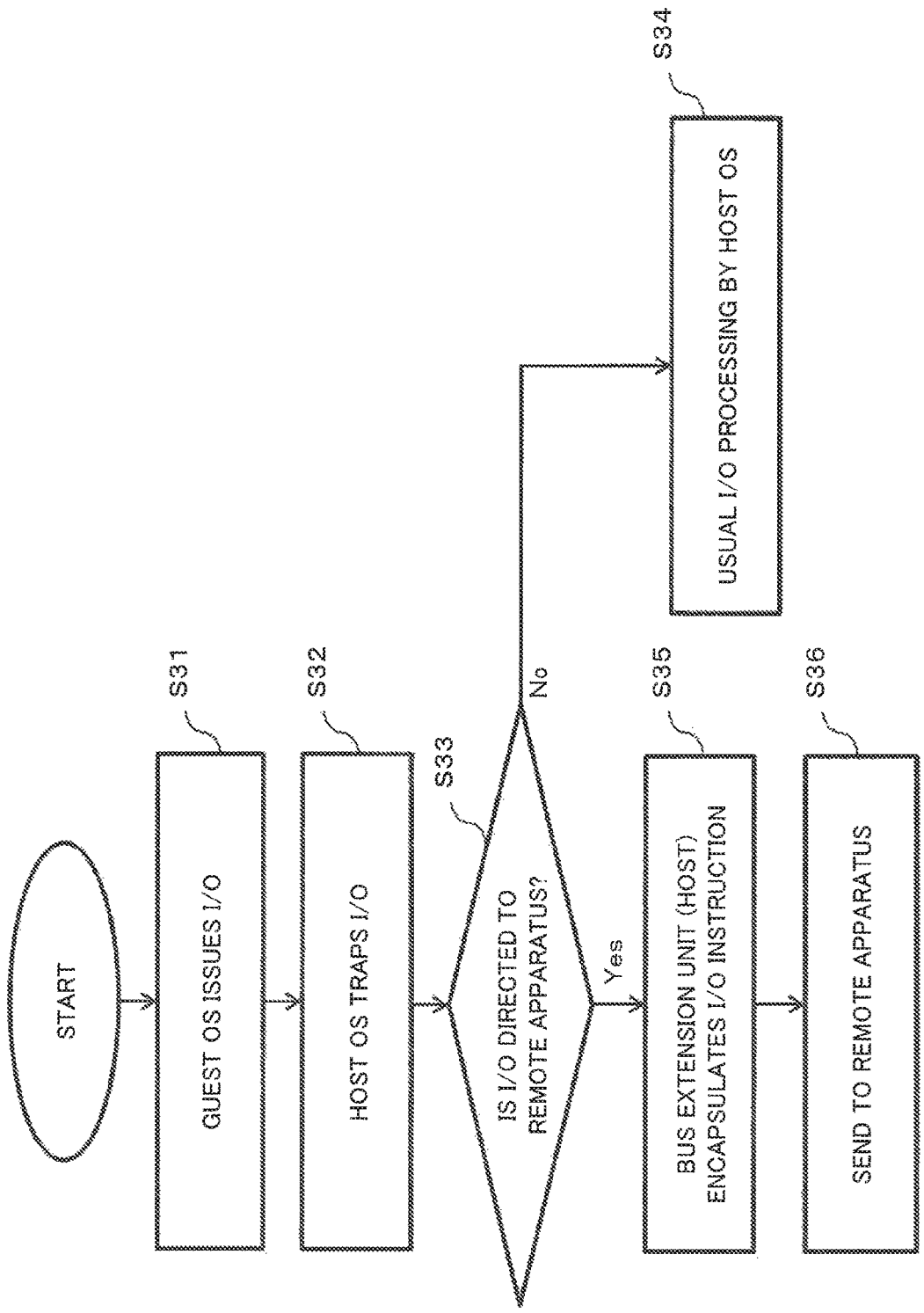
FIG. 7 is a flowchart illustrating an exemplary operation of processing an I/O instruction by the data-processing apparatus in the first exemplary embodiment.

FIG. 7 is a flowchart illustrating an exemplary flow in which the host OS 14 processes an I/O instruction issued by the guest OS 18. The flow will be described below in detail with reference to the flowchart in FIG. 7.

First, the guest OS 18 issues an I/O instruction (step S31).

The host OS 14 traps the I/O instruction (step S32) and control is transferred to the host OS 14. For example, a method for trapping the I/O instruction may be used in which I/O instructions are prevented from being issued while the guest OS 18 is running and the host OS 14 intercepts an illegal issued instruction trap. In the case of MMIO (Memory-Mapped I/O), a method may be used in which an access prohibit attribute is set for an area of a physical memory space that is allocated to the device and the host OS 14 intercepts an illegal memory access trap. However, methods used for trapping the I/O instruction is not limited to the above in the present invention.

The bus extension unit (host) 16 checks whether the issued I/O instruction is directed to a recognized remote apparatus 20 (step S33).

If the I/O instruction is not directed to the remote apparatus 20 (No at step S33), the bus extension unit (host) 16 executes usual I/O processing for a device for which the I/O instruction is to be executed (step S34).

On the other hand, if the I/O instruction is directed to the remote apparatus (Yes at step S33), the bus extension unit (host) 16 encapsulates the I/O instruction (step S35). In this case, the bus extension unit (host) 16 sets the address for the communication unit of the remote apparatus as the destination of the network packet.

The bus extension unit (host) 16 passes the encapsulated I/O instruction to the virtual switch unit 15. The virtual switch unit 15 sends the network packet to the remote apparatus 20 via the communication unit 13 and the network 30 (step S36).

Figure 8:
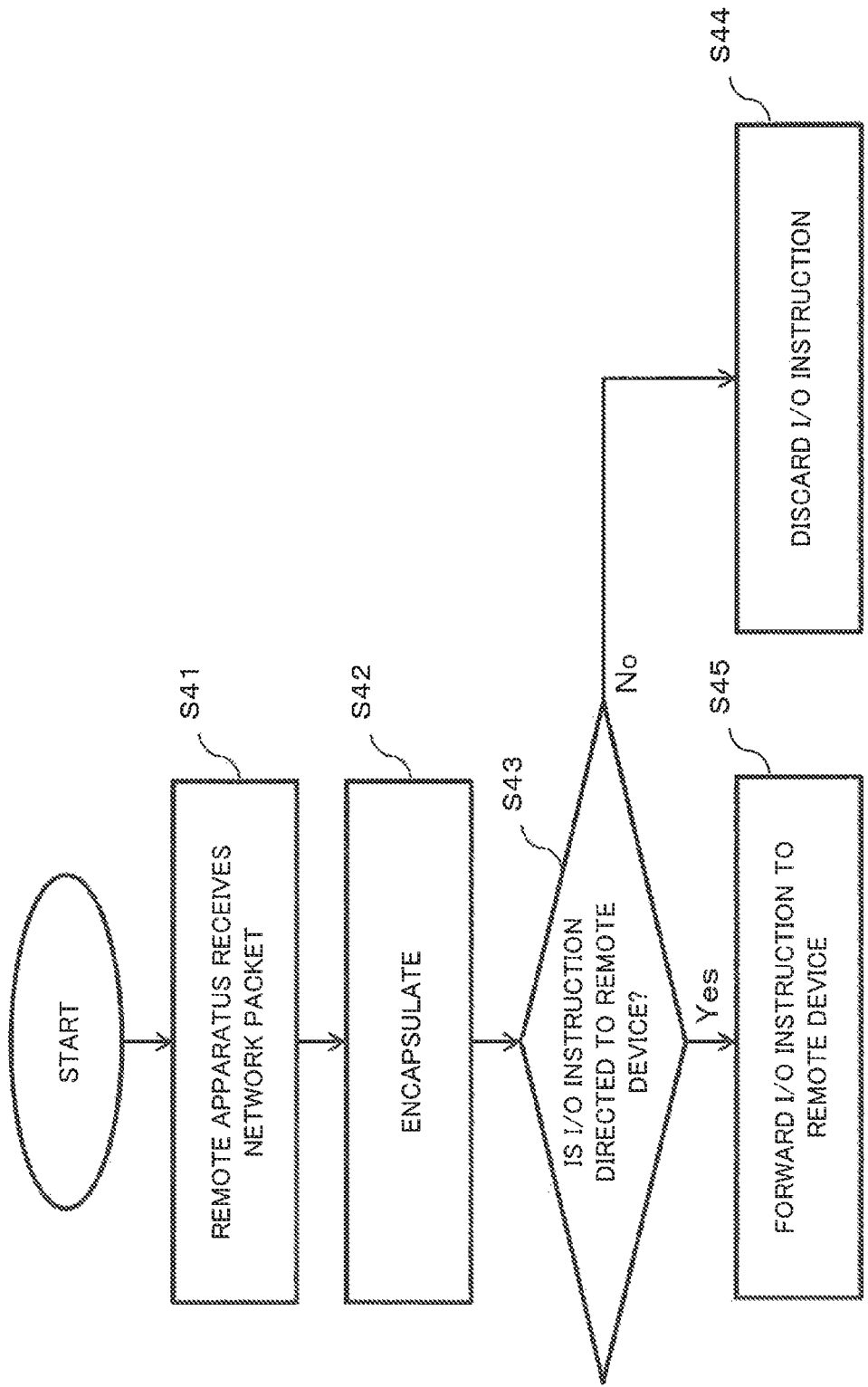
FIG. 8 is a flowchart illustrating an exemplary operation of processing a network packet received by a remote apparatus in the first exemplary embodiment.

FIG. 8 is a flowchart illustrating an exemplary flow for the remote apparatus 20 to receive a network packet via the network 30 and process the network packet. The flow will be described below in detail with reference to the flowchart in FIG. 8.

First, the communication unit 22 of the remote apparatus 20 receives a network packet from the network 30 (step S41). The bus extension unit (remote) 24 decapsulates the network packet (step S42) and confirms the extracted I/O instruction to see whether it is directed to the remote device 26 connected to the remote apparatus 20 (step S43).

If the extracted I/O instruction is not directed to the remote device 26 connected to the remote apparatus 20 (No at step S43), the bus extension unit (remote) 24 discards the I/O instruction (step S44).

On the other hand, if the extracted I/O instruction is directed to the remote device connected to the remote apparatus (Yes at step S43), the bus extension unit (remote) 24 issues the I/O instruction to the remote device 26 (step S45). The remote device 26 processes the provided I/O instruction.

Figure 9:
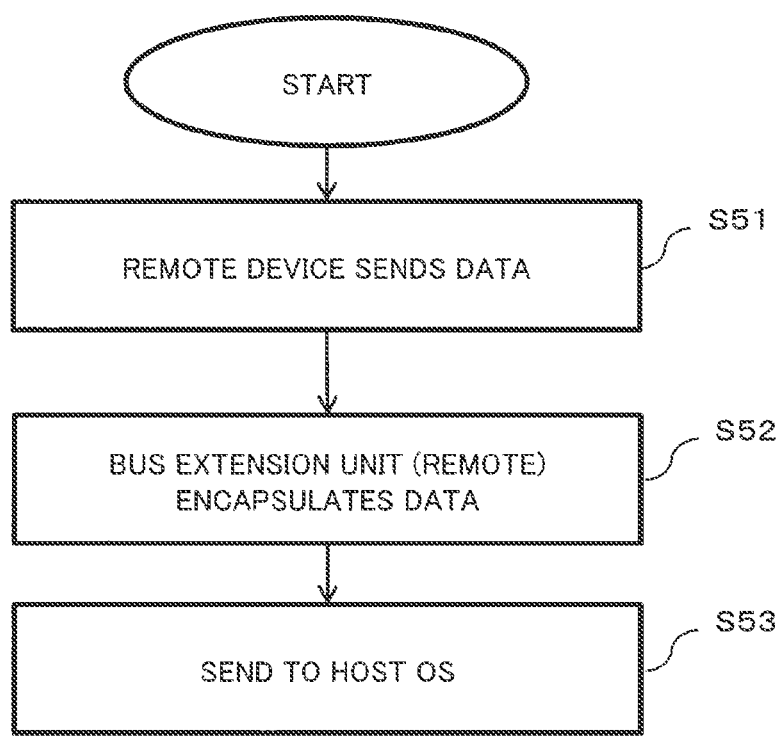
FIG. 9 is a flowchart illustrating an exemplary operation of processing data transmitted by a remote device in the first exemplary embodiment.

FIG. 9 is a flowchart illustrating an exemplary flow of process for the remote device 26 connected to the remote apparatus 20 to send data. The flow will be described below in detail with reference to the flowchart in FIG. 9.

First, the remote device 26 sends data (step S51). The remote device 26 may send data on an occasion when an I/O instruction issued from the host OS 14 is to read data from the remote device 26 into a memory and the data are to be sent from the remote device 26 to the memory.

The bus extension unit (remote) 24 encapsulates the data sent from the remote device 26 and passes the encapsulated data to the communication unit 22 (step S52). The bus extension unit (remote) sets the address for the communication unit 13 as the destination of the encapsulated network packet. In addition, the bus extension unit (remote) 24 sets a certain value in a type field (for example the Ether type field in Ethernet) of the network packet in order to explicitly indicate that the communication is carried out between the bus extension units 16 and 24. Then, the communication unit 22 sends the network packet onto the network 30 (step 53) to the host OS 14.

Figure 10:
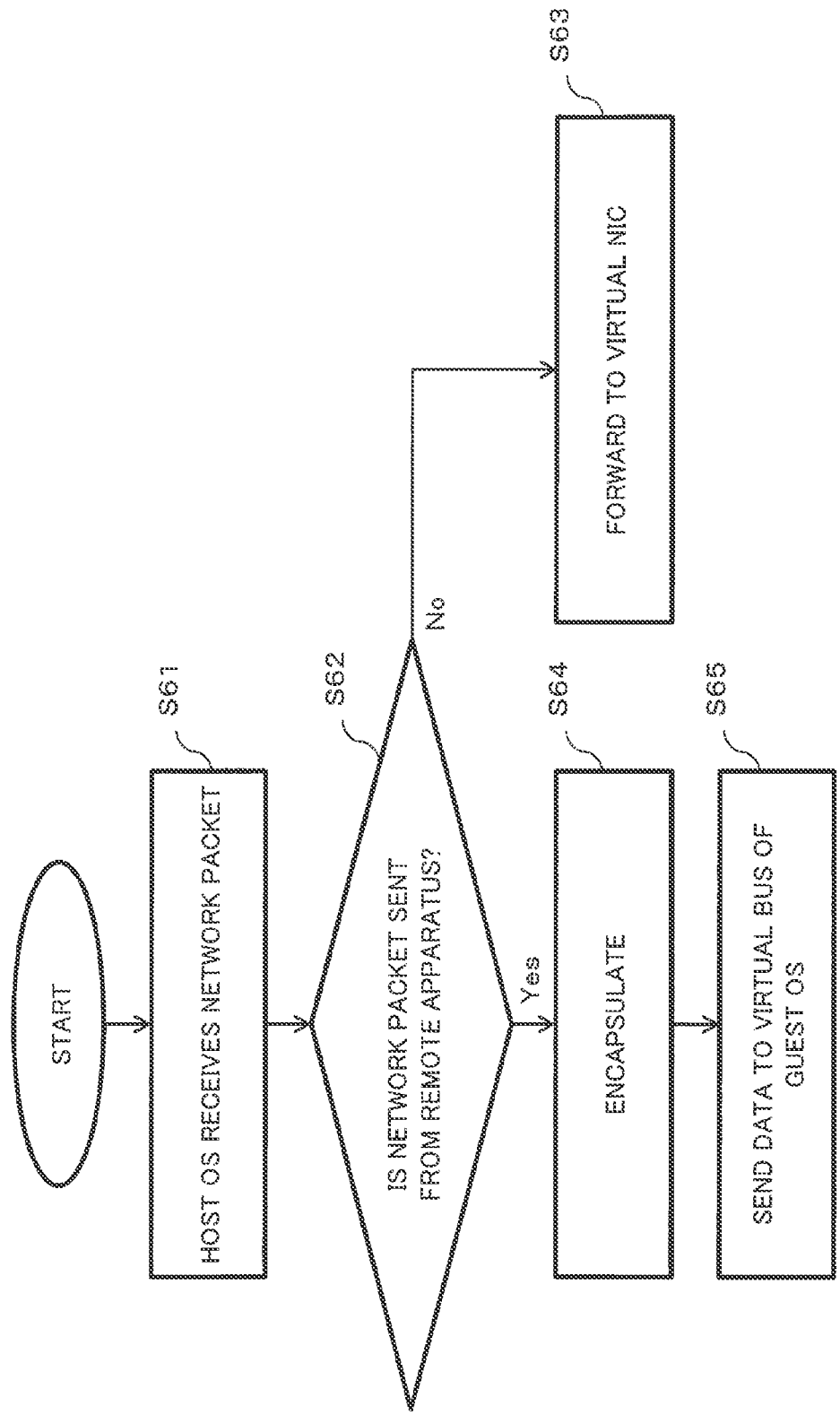
FIG. 10 is a flowchart illustrating an exemplary operation of processing a network packet received by the data-processing apparatus in the first exemplary embodiment.

FIG. 10 is a flowchart illustrating an exemplary flow in which the communication unit 13 receives a network packet from the network 30 and processes the network packet. The flow will be described in detail below with reference to the flowchart in FIG. 10.

First, the communication unit 13 receives a network packet from the network 30 and passes the network packet to the virtual switch unit 15 of the host OS 14 (step S61).

The virtual switch unit 15 checks the type field of the network packet to confirm whether the received network packet is from the remote apparatus 20 (step S62).

When the packet is not the network packet from the remote apparatus 20 (No at step S62), the virtual switch unit 15 transfers the network packet to the virtual NIC 17 because the communication is usual network communication (step S63).

On the other hand, when the network packet is from the remote apparatus (Yes at step S62), the virtual switch unit 15 passes the network packet to the bus extension unit (host) 16. The bus extension unit (host) 16 decapsulates the network packet to extract the data (step S64) and sends the data to the guest OS 18 (step S65).

[Advantageous Effect]

Advantageous effects of the computer system of the present exemplary embodiment will be described next. In the present exemplary embodiment, the bus extension unit (host) 16 provided in the host OS 14 encapsulates an I/O instruction issued from the guest OS 18 and sends out the encapsulated I/O instruction onto the network 30. That is, according to the present exemplary embodiment, the need for encapsulation of I/O instructions by the upstream bridge (bus extension unit (host)) 202 is eliminated, which is required by the combination of PTL 1 (FIG. 15) and PTL 2 (FIG. 16). Therefore, according to the present exemplary embodiment, the pass-through technique in which the guest OS 18 directly controls a remote device 26 can be applied, even when the data-processing apparatus 10 on which the guest OS is running is a computer that does not include a slot (for example a PC card slot) which is capable of installing an upstream bridge. Furthermore, according to the present exemplary embodiment, it is possible to use a remote device even when there is no available expansion slot no the host computer (data-processing apparatus 10), because the bus extension unit (host) 16 is implemented by software. For these reasons, according to the present exemplary embodiment, the applicability of the pass-through technique can be expanded.

Furthermore, according to the present exemplary embodiment, there is no need to recognize the remote device 26 during the start process of the host OS 14, because the bus extension unit (host) 16 manages allocation of the remote device 26 to the guest OS 18. Accordingly, the host OS 14 can be quickly started.

Second Exemplary Embodiment

A computer system according to a second exemplary embodiment will be described next with reference to drawing. In the present exemplary embodiment, the computer system includes a data-processing apparatus and a plurality of remote apparatuses.

[Configuration]

Figure 11:
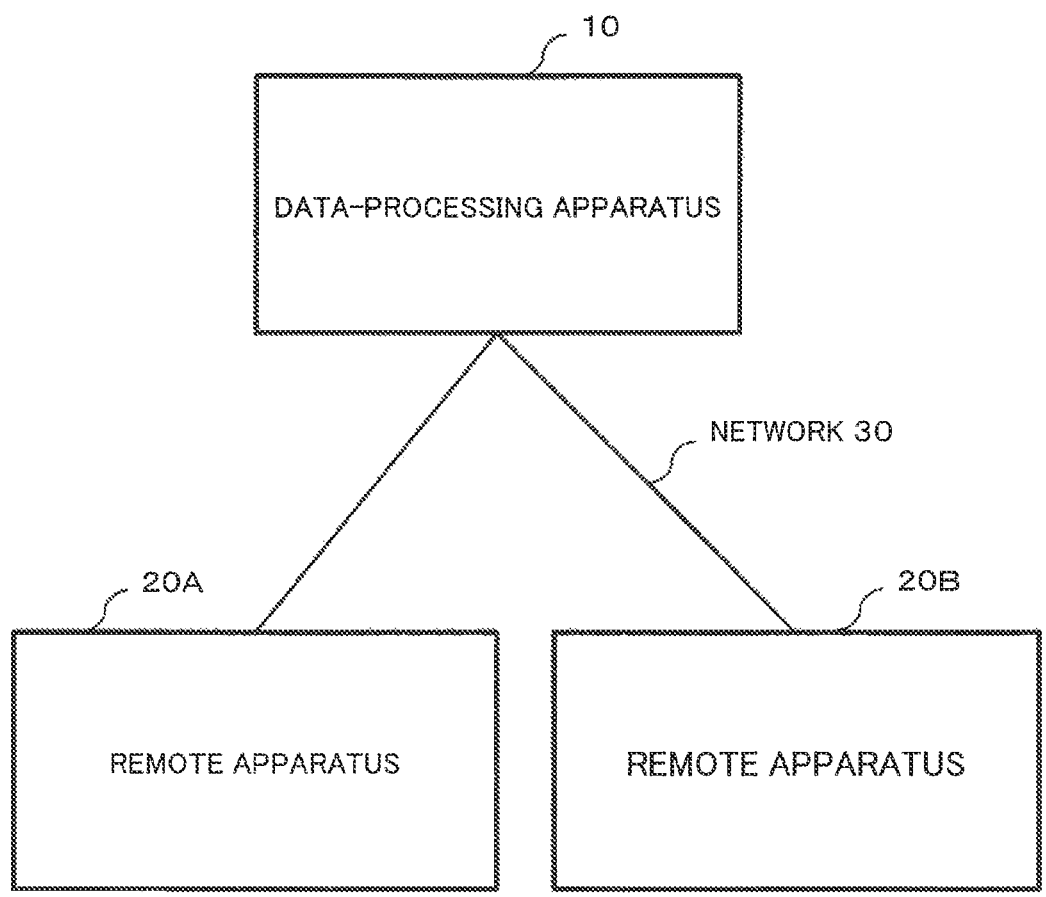
FIG. 11 is a diagram illustrating an exemplary configuration of a computer system according to a second exemplary embodiment of the present invention.

FIG. 11 is a diagram illustrating an exemplary configuration of the computer system according to the present exemplary embodiment. Referring to FIG. 11, the computer system includes two remote apparatuses 20A and 20B, for example. However, the number of remote apparatuses in the present exemplary embodiment is not limited to the illustrated embodiment.

A configuration of the data-processing apparatus 10 according to the present exemplary embodiment is similar to the configuration of the data-processing apparatus 10 in the first exemplary embodiment (FIG. 4). Each of the remote apparatuses 20A and 20B has a configuration similar to the configuration of the remote apparatus in the first exemplary embodiment (FIG. 3). However, since a plurality of remote apparatuses 20A and 20B may exist in the present exemplary embodiment includes, a bus extension unit (host) 16 retains an association table which associates a remote device 26 held by each of the remote apparatuses 20A and 20B with a communication unit 22 of each of the remote apparatuses 20A and 20B.

FIG. 12 is a diagram illustrating exemplary entries of the association table retained by the bus extension unit (host) 16. Referring to FIG. 12, the association table retains the MAC address of the communication unit 22 of each for the remote apparatuses 20A and 20B in association with information with respect to a remote device 26. It is assumed here as an example that the MAC address for the communication unit 22 of the remote apparatus 20A is "00:00:00:00:00:10" and the remote apparatus 20A includes a storage "a" manufactured by company A as a remote device 26 which is. It is also assumed that the MAC address for the communication unit 22 of the remote apparatus 20B is "00:00:00:00:00:20", and the remote apparatus 20B includes a keyboard "b" manufactured by company B as a remote device 26.

The bus extension unit (host) 16 can generate the association relationship between the MAC addresses and the remote devices 26 illustrated in FIG. 12 by receiving heart beats (step S23 of FIG. 6) which are sent from the remote devices 20A and 20B (step S12 of FIG. 5).

An access process from the guest OS 18 to the remote device 26 is carried out as follows. An example will be described in which the access process is data transmission from the guest OS 18 to the "storage a manufactured by company A".

Referring to FIG. 7, the bus extension unit (host) 16 of the host OS 14 traps an I/O instruction (step S32) issued by the guest OS 18 (step S31).

The bus extension unit (host) 16 then confirms that the issued I/O instruction is directed to the remote apparatus 20A that the bus extension unit (host) 16 has recognized (Yes at step S33). The bus extension unit (host) 16 searches for the MAC address of the remote apparatus 20A that has the "storage a manufactured by company A" by using the association table illustrated in FIG. 12, and extracts the address "00:00:00:00:00:10".

The bus extension unit (host) 16 then encapsulates the I/O instruction to generate a network packet using the address "00:00:00:00:00:10" for the communication unit 22 of the remote apparatus 20A as the destination of the network packet (step S35).

The bus extraction unit (host) 16 then sends out the generated network packet to the remote apparatus 20A (step S36).

[Advantageous Effects]

In the computer system according to the present exemplary embodiment, the bus extension unit (host) 16 on the host OS 14 retains an association table (FIG. 12) which associates the address for the communication unit of each remote apparatus with a remote device held by the remote apparatus. The bus extenuation unit (host) 16 encapsulates an I/O instruction issued by a guest OS 18 to a remote device, and sends out the encapsulated I/O instruction with specifying the address for the communication unit of the remote apparatus that includes the remote device as the destination based on the association table. According to the computer system as described above, there is no need for encapsulation of I/O instructions by hardware. In addition, a remote device provided in each of a plurality of remote apparatuses can be directly controlled from the guest OS even when there is no available expansion slots on the data-processing apparatus 10.

Third Exemplary Embodiment

A computer system according to a third exemplary embodiment will be described next with reference to drawings. In the third exemplary embodiment, a plurality of guest OSs are running on a data-processing apparatus.

[Configuration]

Figure 13:
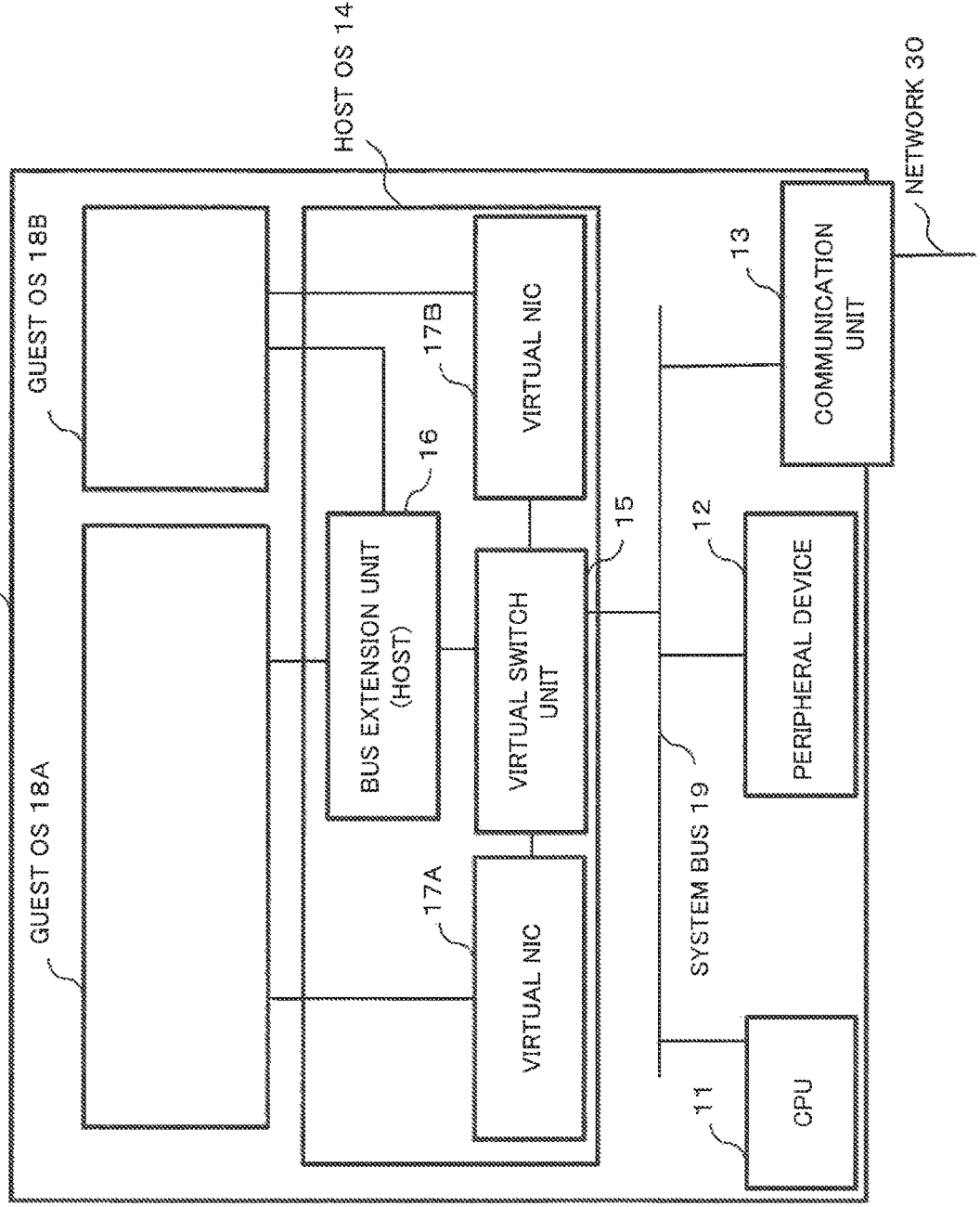
FIG. 13 is a block diagram illustrating an exemplary configuration of a data-processing apparatus according to a third exemplary embodiment of the present invention.

FIG. 13 is a block diagram illustrating an exemplary configuration of the data-processing apparatus 10 in the computer system of the present exemplary embodiment. Referring to FIG. 13, two guest OSs 18A and 18B are running on the data-processing apparatus 10. However, the number of guest OSs in the present exemplary embodiment is not limited to the illustrated embodiment.

Virtual NIC 17A and 17B are respectively assigned to the guest OSs 18A and 18B. On the other hand, the bus extension unit (host) 16 is shared by the guest OSs 18A and 18B. In the present exemplary embodiment, the bus extension unit (host) 16 retains an association table that associates each of the guest OSs 18A and 18B with the remote device 26.

FIG. 14 is a diagram illustrating exemplary entries of the association table held by the bus extension unit (host) 16. Referring to FIG. 14, the association table retains the MAC addresses for communication units 22 of remote apparatuses 20A and 20B, information with respect to remote devices 26, and management guest OSs in association with one another. By receiving heart beats sent out from the remote apparatuses 20, it is possible for the bus extension unit (host) 16 to obtain association relationships between the MAC addresses for the communication units 22 and the information with respect to the remote devices 26. On the other hand, an assignment of the guest OSs to the plurality of remote apparatuses 20A and 20B are set up in advance. The management guest OS included in the association table in FIG. 14 indicates an assignment of the remote apparatuses 20A and 20B to each of the guest OSs 18A and 18B on the host OS 14. Note that upon assignment of the guest OSs 18A and 18B, an identifier (ID) is allocated to each of the guest OSs 18A and 18B.

It is assumed here that the MAC address for the communication unit 22 of the remote apparatus 20A is "00:00:00:00:00:10" and the remote apparatus 20A has a storage "a" manufactured by company A as the remote device 26. It is also assumed that the MAC address for the communication unit 22 of the remote apparatus 20B is "00:00:00:00:00:20" and the remote apparatus 20B has a keyboard "b" manufactured by company B as the remote device 26. Furthermore, it is assumed that the remote apparatus 20A is assigned to the guest OS 18A with an identifier "A" and the remote apparatus 20B is assigned to the guest OS 18B with an identifier "B".

A access processing from the guest OS to the remote device 26 is carried out as described below. An example will be described in which the access processing is data transmission from the guest OS 18B to the "keyboard "b" manufactured by company B".

Referring to FIG. 7, the bus extension unit (host) 16 of the host OS 14 traps an I/O instruction (step S32) issued from the guest OS 18B (step S31).

The bus extension unit (host) 16 then confirms that the issued I/O instruction is directed to the remote apparatus 20B which the bus extension unit (host) 16 has recognized (Yes at step S33). The bus extension unit (host) 16 searches for the MAC address for the remote apparatus 20B that has the "keyboard "b" manufactured by company B" and extracts the address "00:00:00:00:00:20", by using the association table illustrated in FIG. 14.

The bus extension unit (host) 16 then encapsulates the I/O instruction to generate a network packet using the address "00:00:00:00:00:20" for the communication unit 22 of the remote apparatus 20B as the destination of the network packet (step S35).

The bus extension unit (host) 16 then sends out the generated network packet to the remote apparatus 20B (step S36).

Note that transmission and reception of data between the guest OS and the remote device (the remote apparatus 20) which are not associated with each other in the association table is not permitted. Further, it is not possible for the guest OS to recognize the remote device 26 with which the guest OS is not associated in the association table. In the exemplary association table illustrated in FIG. 14, the guest OS 18A cannot recognize the remote apparatus 20B. Similarly, the guest OS 18B cannot recognize the remote apparatus 20A.

[Advantageous Effects]

In the computer system according to the present exemplary embodiment, the host extension unit (host) 16 on the host OS 14 retains an association table (FIG. 14) which associates the address for the communication unit of the remote apparatus, the remote device provided in the remote apparatus, and the identifier of the guest OS to which the remote apparatus is allocated with one another.

With reference to the association table, the bus extension unit (host) 16 encapsulates an I/O instruction issued by the guest OS to the remote device and sends out the encapsulated I/O instruction by specifying the address for the communication unit of the remote apparatus that has the remote device assigned to the guest OS as its destination. According to the computer system as described above, the need for encapsulation of I/O instructions by hardware may be eliminated. In addition, each of a plurality of guest OSs is capable of directly controlling the remote device on the remote apparatus allocated to the guest OS even when there is no available expansion slot on the data-processing apparatus 10.

Computer systems, data-processing apparatuses, bus-data transferring methods and computer-readable media according to the exemplary embodiments of the present invention may be applied for the purpose of assigning the remote devices connected via a network to the guest OSs in an environment where the computer and the devices are remotely connected with each other. In particular, computer systems, data-processing apparatuses, bus-data transferring methods and computer-readable recording media according to the exemplary embodiments of the present invention may be applied for the purpose of making the remote device available when there is no available slots for the device on a computer.

It should be noted that all of the disclosures in the patent literatures cited above are incorporated herein by reference. Within the scope of the entire disclosure of the present invention (including the Claims), and based on the basic technical idea of the present invention, various changes and adjustments may be made to the exemplary embodiments. Furthermore, various combinations or selections of the disclosed various elements (including the elements of the Claims, the elements of embodiments, and elements of the drawings) are possible within the scope of the entire disclosure of the present invention. In other words, obviously, the present invention encompasses variations and modifications that could be made by those skilled in the art in accordance with the entire disclosure including the claims and the technical idea. In particular, the ranges of numerical values disclosed herein are to be understood as encompassing any and all numerical values or subranges subsumed therein as if each numerical value and subrange is explicitly recited even though the value or subranges are not set forth.

This application is based upon and claims the benefit of priority from Japanese Patent Application No. 2014-068140, filed on Mar. 28, 2014, the disclosure of which is incorporated herein by reference in its entirety.

REFERENCE SIGNS LIST

10 Data-processing apparatus
11 Central Processing Unit (CPU)
12 Peripheral device
13 Communication unit
14 Host operating system (OS)
15 Virtual switch unit
16 Bus extension unit (host)
17, 17A, 17B Virtual network interface card (NIC)
18, 18A, 18B Guest OS
19 System bus
20, 20A, 20B Remote apparatus
22 Communication unit
24 Bus extension unit (remote)
26 Remote device
30 Network
100 Computer
101 CPU
102 Peripheral device
103 Device B
104 Host OS
105 Device driver B
106 Virtual device A
108 Guest OS
109 Device driver A
119 System bus 200 Computer
201 CPU
202 Upstream bridge (bus extension unit (host))
203 Ethernet adapter
204 Communication unit
206 OS
207 Device driver A
219 System bus
300 Computer
302 Communication unit
400 Downstream bridge (bus extension unit (remote))
402 Ethernet adapter
500 Peripheral device (remote device A)
602 Ether switch
604 Network switch

The invention claimed is:

1. A data-processing apparatus providing a virtual hardware environment for a guest OS (Operating System) comprising:
a bus extender configured to trap an I/O instruction issued by the guest OS, encapsulate the trapped I/O instruction, and send out the encapsulated I/O instruction as a network packet to a remote apparatus, the guest OS performing I/O processing with a device implemented in the remote apparatus connected via a network;
a communication unit of the data-processing apparatus that is an interface communicating with the network;
a virtual NIC (Network Interface Card) used by the guest OS and configured to communicate with another computer or another guest OS; and
a virtual switch configured to connect selected one of the bus extender and the virtual NIC with the communication unit of the data-processing apparatus, wherein
the remote apparatus sends information including an identifier indicating the device implemented in the remote apparatus and an address for a communication unit of the remote apparatus,
the bus extender further configured to recognize the device implemented in the remote apparatus based on information sent by the remote apparatus and including the identifier indicating the device implemented in the remote apparatus and an address for the communication unit of the remote apparatus, and specify the address for the communication unit of the remote apparatus as a destination address for the network packet into which the I/O instruction is encapsulated,
the bus extender includes a table retaining the address for the communication unit of the remote apparatus and the identifier indicating the device implemented in the remote apparatus included in the information in association with each other, and upon trapping the I/O instruction issued by the guest OS, the bus extender further configured to extract the address for the communication unit of the remote apparatus including the device to which the I/O instruction is issued from the table, and specify the extracted address as the destination address for the network packet into which the I/O instruction is encapsulated,
the table retains the address for the communication unit of the remote apparatus and the identifier indicating the device implemented in the remote apparatus which are included in the information, and the guest OS is allocated to the remote apparatus in association with one another, and
the bus extender further configured to extract the address for the communication unit of the remote apparatus from the table and specify the extracted address as the destination address for the network packet into which the I/O instruction is encapsulated, when the remote apparatus including the device to which the I/O instruction is issued is allocated to the guest OS that issues the I/O instruction.

2. The data-processing apparatus according to claim 1, wherein
upon receiving a response network packet from the remote apparatus in response to the sent-out network packet, the bus extender decapsulates the response network packet to extract data and transfers the extracted data to the guest OS.

3. The data-processing apparatus according to claim 1, wherein
the guest OS initializes the device implemented in the remote apparatus using a device driver held by the guest OS upon start of the guest OS after start of a host OS, the host OS running on the data-processing apparatus and providing the virtual hardware environment for the guest OS.

4. The data-processing apparatus according to claim 3, wherein
the remote apparatus decapsulates the received network packet to extract the I/O instruction and transfers the I/O instruction to the device when receiving the network packet into which the I/O instruction is encapsulated from the data-processing apparatus; and,
the remote apparatus encapsulates the acquired data and sends out the encapsulated data as a network packet to the host OS when acquiring data resulting from execution of the I/O instruction from the device.

5. A computer system comprising:
a data-processing apparatus and a remote apparatus interconnected via a network,
the data-processing apparatus providing a virtual hardware environment for a guest OS (Operating System) performing I/O processing with a device implemented in the remote apparatus, and the data-processing apparatus comprising:
a bus extender configured to trap an I/O instruction issued by the guest OS, encapsulate the trapped I/O instruction, and send out the encapsulated I/O instruction as a network packet to the remote apparatus;
a communication unit of the data-processing apparatus that is an interface communicating with the network;
a virtual NIC (Network Interface Card) used by the guest OS and configured to communicate with another computer or another guest OS; and
a virtual switch configured to connect selected one of the bus extender and the virtual NIC with the communication unit of the data-processing apparatus, wherein
the remote apparatus sends information including an identifier indicating the device implemented in the remote apparatus and an address for a communication unit of the remote apparatus,
the bus extender further configured to recognize the device implemented in the remote apparatus based on information sent by the remote apparatus and including the identifier indicating the device implemented in the remote apparatus and an address for the communication unit of the remote apparatus, and specify the address for the communication unit of the remote apparatus as a destination address for the network packet into which the I/O instruction is encapsulated, the bus extender includes a table retaining the address for the communication unit of the remote apparatus and the identifier indicating the device implemented in the remote apparatus included in the information in association with each other, and upon trapping the I/O instruction issued by the guest OS, the bus extender further configured to extract the address for the communication unit of the remote apparatus including the device to which the I/O instruction is issued from the table, and specify the extracted address as the destination address for the network packet into which the I/O instruction is encapsulated, the table retains the address for the communication unit of the remote apparatus and the identifier indicating the device implemented in the remote apparatus which are included in the information, and the guest OS is allocated to the remote apparatus in association with one another, and the bus extender further configured to extract the address for the communication unit of the remote apparatus from the table and specify the extracted address as the destination address for the network packet into which the I/O instruction is encapsulated, when the remote apparatus including the device to which the I/O instruction is issued is allocated to the guest OS that issues the I/O instruction.

6. A bus-data transferring method carried out by-a data-processing apparatus on which a host OS (Operating System) providing a virtual hardware environment for a guest OS performing I/O processing with a device implemented in a remote apparatus connected via a network is running, comprising:

in a bus extender, trapping an I/O instruction issued by the guest OS, encapsulating the trapped I/O instruction, and sending out the encapsulated I/O instruction as a network packet to the remote apparatus;

in a virtual NIC (Network Interface Card) used by the guest OS, communicating with another computer or another guest OS;

in a virtual switch, connecting selected one of the bus extender and the virtual NIC with a interface communicating with the network;

in the bus extender, receiving information including an identifier indicating the device implemented in the remote apparatus and an address for a communication unit of the remote apparatus from the remote apparatus;

in the bus extender, recognizing the device implemented in the remote apparatus and specifying the address for the communication unit of the remote apparatus as a destination address for the network packet into which the I/O instruction is encapsulated, based on the information;

in the bus extender, retaining the address for the communication unit of the remote apparatus and the identifier indicating the device implemented in the remote apparatus included in the information in association with each other in a table;

in the bus extender, extracting the address for the communication unit of the remote apparatus including the device to which the I/O instruction is issued from the table upon trapping the I/O instruction issued by the guest OS;

in the bus extender, specifying the extracted address as the destination address for the network packet into which the I/O instruction is encapsulated;

in the bus extender, retaining the address for the communication unit of the remote apparatus and the identifier indicating the device implemented in the remote apparatus which are included in the information, and the guest OS allocated to the remote apparatus in association with one another in the table; and in the bus extender, extracting the address for the communication unit of the remote apparatus that includes a device to which the I/O instruction is issued from the table when trapping the I/O instruction issued by the guest OS and when the remote apparatus including the device to which the I/O instruction is issued is allocated to the guest OS that issues the I/O instruction.

7. The bus-data transferring method according to claim 6, further comprising:

in the bus extender, receiving a response network packet from the remote apparatus in response to the network packet that was sent out; and in the bus extender, decapsulating the response network packet to extract data and forwarding the extracted data to the guest OS.

8. The bus-data transferring method according to claim 6, wherein the host OS starts;

the guest OS starts after the start of the host OS; and upon start of the guest OS, the guest OS initializes the device implemented in the remote apparatus by using a device driver held by the guest OS.

9. A non-transitory computer-readable recording medium storing a program causing a computer on which a host OS (Operating System) providing a virtual hardware environment to a guest OS performing I/O processing with a device implemented in a remote apparatus connected via a network is running, to execute the steps of:

in a bus extender, trapping an I/O instruction issued by the guest OS, encapsulating the trapped I/O instruction and sending out the encapsulated I/O instruction as a network packet to the remote apparatus;

in a virtual NIC (Network Interface Card) used by the guest OS, communicating with another computer or another guest OS;

in a virtual switch, connecting selected one of the bus extender and the virtual NIC with a interface communicating with the network;

in the bus extender, receiving information including an identifier indicating the device implemented in the remote apparatus and an address for a communication unit of the remote apparatus from the remote apparatus;

in the bus extender, recognizing the device implemented in the remote apparatus and specifying the address for the communication unit of the remote apparatus as a destination address for the network packet into which the I/O instruction is encapsulated, based on the information;

in the bus extender, retaining the address for the communication unit of the remote apparatus and the identifier indicating the device implemented in the remote apparatus included in the information in association with each other in a table;

in the bus extender, extracting the address for the communication unit of the remote apparatus including the device to which the I/O instruction is issued from the table upon trapping the I/O instruction issued by the guest OS;

in the bus extender, specifying the extracted address as the destination address for the network packet into which the I/O instruction is encapsulated;

in the bus extender, retaining the address for the communication unit of the remote apparatus and the identifier indicating the device implemented in the remote apparatus which are included in the information, and the guest OS allocated to the remote apparatus in association with one another in the table; and in the bus extender, extracting the address for the communication unit of the remote apparatus that includes a device to which the I/O instruction is issued from the table when trapping the I/O instruction issued by the guest OS and when the remote apparatus including the device to which the I/O instruction is issued is allocated to the guest OS that issues the I/O instruction.

* * * * *